United States Patent [19]
Shields et al.

[11] Patent Number: 5,539,764
[45] Date of Patent: Jul. 23, 1996

[54] LASER GENERATED X-RAY SOURCE

[75] Inventors: Henry Shields; Michael Powers, both of San Diego, Calif.

[73] Assignee: Jamar Technologies Co., San Diego, Calif.

[21] Appl. No.: 434,860

[22] Filed: May 4, 1995

Related U.S. Application Data

[63] Continuation-in-part of Ser. No. 295,283, Aug. 24, 1994, and a continuation-in-part of Ser. No. 339,755, Nov. 15, 1994, Pat. No. 5,491,707.

[51] Int. Cl.$^6$ ...................................................... H01S 3/22
[52] U.S. Cl. .............................. 372/57; 372/39; 372/10; 372/18; 372/25; 372/22; 372/70; 372/28
[58] Field of Search ................................. 372/57, 53, 39, 372/10, 98, 18, 25, 22, 95, 69, 70

[56] References Cited

U.S. PATENT DOCUMENTS

| 4,205,278 | 5/1980 | George et al. | 372/57 |
| 5,081,635 | 1/1992 | Wakabayashi et al. | 372/57 |
| 5,157,684 | 10/1992 | Benda et al. | 372/95 |

OTHER PUBLICATIONS

O'Neill et al, X–ray emission from plasmas generated from an XeCl laser picosecond Pulse Train, Appl Phys Lett 55/25 Dec. 18.

Xenakis et al., Laser–plasma x–ray generation using an injection–mode–locked–XeCl, J Appl Phys 71(1) 1 Jan. 92.

*Primary Examiner*—Leon Scott, Jr.
*Attorney, Agent, or Firm*—John R. Ross

[57] ABSTRACT

An improved high average power, high brightness laser system. The laser system comprises an XeCl excimer amplifier, an XeCl excimer preamplifier, a means for generating a picosecond seed pulse tailored for the XeCl preamplifier and the XeCl amplifier and a means for focusing the output pulse laser beam onto a spot smaller in area than $100 \times 10^{-6}$ cm$^2$. We first produce a seed laser beam consisting of a series of bunches of short duration pulses with a bunch frequency in excess of 100 pulses per second. These seed laser pulses are produced by a Nd:YAG pumped dye laser oscillator with a cavity dumper. The pulses in the beam are preamplified in a multipass preamplifier and the pulses are then multiplexed in a pulse train generator into a larger number of lower power pulses. A multi-pass laser amplifier then amplifies each pulse in the bunched pulse laser beam to produce an amplified pulse laser beam which is then tightly focused to so that the individual pulses are at brightness levels in excess of $10^{11}$ Watts/cm$^2$. A prototype device built and tested by Applicants and their fellow workers has produced a pulsed laser beam with 50 ps, $30 \times 10^{-3}$ Joule pulses at 1,120 pulses per second to provide a beam with average power of 34 Watts. Focusing the beam at a 10 micron diameter spot produces intensity levels of $7 \times 10^{14}$ per cm$^2$. Using an iron target Applicants have produced X-ray sources of average X-ray power levels in excess of 3.5 Watts. This source is capable of printing integrated circuits with dimensions in the range of 0.1 micron to 0.25 micron at rates of about 10 wafers per hour.

11 Claims, 5 Drawing Sheets

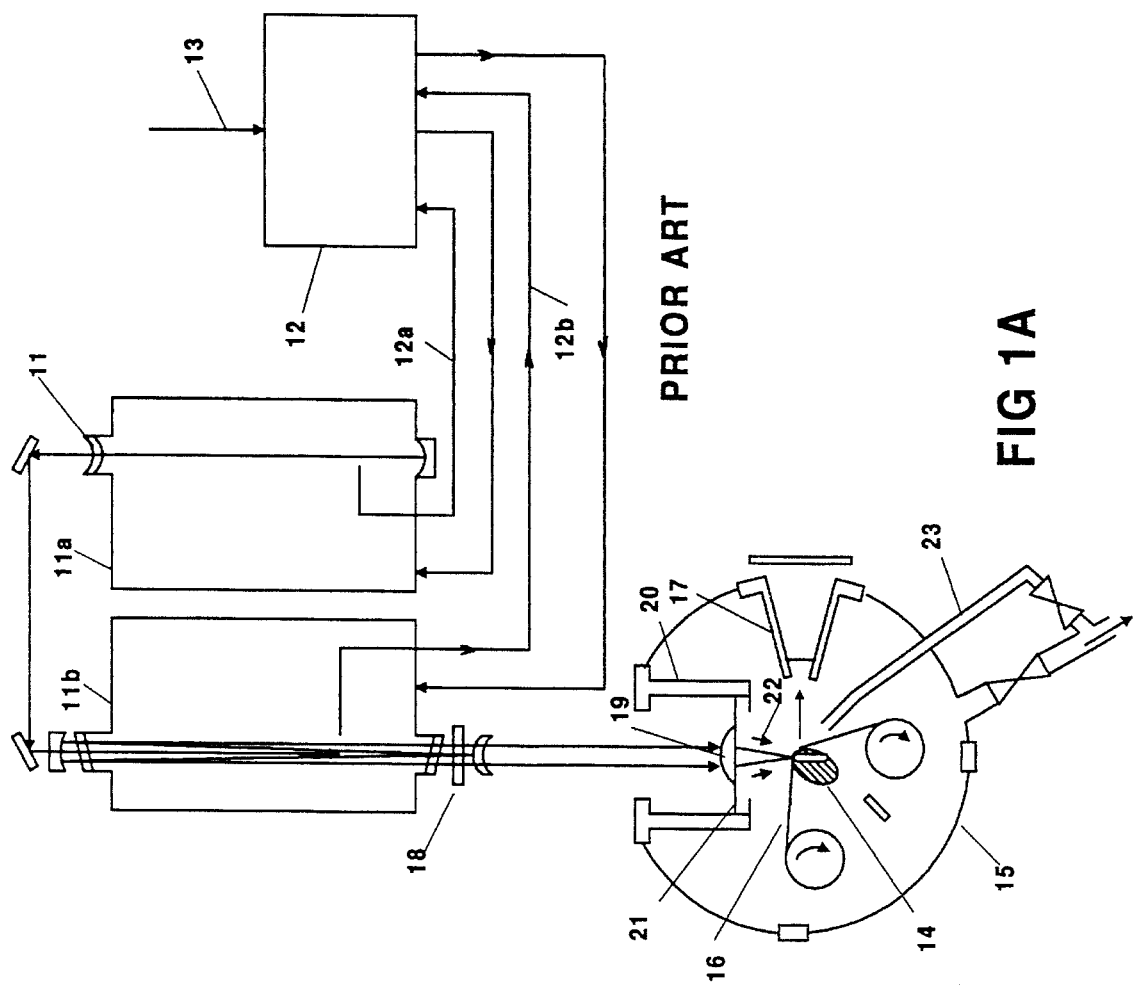

LASER GENERATED X-RAY SOURCE

This invention was made with Government support under Contract No. DAAL01-94-C-0006 awarded by the United States Army Research Laboratory. The Government has rights in the invention.

This invention is a Continuation-in-Part Application of Ser. No.: 08/295,283, filed Aug. 24, 1994 pending and Ser. No.: 08/339,755 filed Nov. 15, 1994 now U.S. Pat. No. 5,491,707. This invention relates to laser systems and in particular to high power, high intensity laser systems for generating X-rays.

BACKGROUND OF THE INVENTION

There is a growing need for reliable, economical X-ray sources for X-ray lithography. It is known that X-ray sources can be produced by illuminating certain metals with very high intensity laser pulses. Required intensity levels are in the range of $10^{11}$ to $10^{13}$ W/cm$^2$ for projection lithography and $10^{13}$ to $10^{15}$ W/cm$^2$ for proximity lithography. Average, power levels of about 3.5 Watts are needed for a production rate of about 10 wafers per hour. To meet future needs for high production rate lithography, average laser power levels up to about 500 Watts for projection and 1000 Watts for proximity are needed. In addition, the lithography process needs call for an X-ray spot diameter of about a few 100 µm. Designing a laser to meet these requirements involves solving several current problems. For nanosecond laser pulses, the energy needed to achieve the required brightness is 10 to 30 Joules per pulse and the repetition rate needed to achieve the required power is 100 to 300 Hertz. This high pulse energy design creates a serious problem. The amount of debris produced by nanosecond pulsed lasers focused on solid targets, when operated at the required brightness and power levels, is unacceptable. (Studies done by Rutherford and CREOL indicate that the debris level from metal targets is related to the pulse duration. The shorter the pulse duration the lower the debris level.) There is a research program underway to reduce debris by using solid xenon as an X-ray target, but it is at a very early stage and costs are uncertain.

Excimer lasers are well known. The construction and operation of these lasers are described in detail in Excimer Lasers, edited by C. K. Rhodes, Springer, 1984.

Workers at the Rutherford Appleton Laboratory have proposed (App. Phys. Lett. 55 (25), December 1989 and 71 (1), January 1992) an excimer laser system delivering a series of 10 to 15 pulses each pulse having a duration of 100 to 150 picoseconds with the pulse train duration of about 20 to 30 nanoseconds. The beam is incident on a moving metal film to produce X-rays. They have also proposed systems described in International Patent Application PCT/GB94/00928, International Publication Number WO 94/26080, published 10 Nov. 1994. These systems utilize a series of about 4 to 16 bunched pulses, each pulse having a duration of about 1 to 10 picoseconds and spaced apart by about 2 nanoseconds to produce pulse trains with durations in the range of about 20 to 30 nanoseconds. This prior art system is represented generally in FIG. 1. A laser pulse generator 25 (comprised of a titanium sapphire oscillator pumped with an argon ion laser) generates a continuous train of pulses of visible or infrared light with a pulse duration of 1–10 picoseconds (ps) and a pulse repetition frequency of 80 MHz. The pulses from the pulse generator 25 are counted by a divider 24 which applies trigger pulses 13 at intervals of 1 ms, i.e. as a train of pulses with a repetition rate of 1 kHz.

This pulse train, or selected pulses from it, is applied to a synchronization and control unit 12. In response to each trigger pulse 13, the control unit 12 opens an optical gate 26 to apply one pulse from the pulse generator 25 to a laser preamplifier 27 which is also triggered with appropriate synchronization by the control unit 12 and which is capable of a repetition rate equal to that of the pulse train applied to it and boosts the energy of each pulse so applied. The output pulses of visible or infrared light from the preamplifier 27 are applied to a frequency converter unit 28 which in turn generates corresponding pulses of uv light (of which the frequency is, for example, two or three times that of the visible or infrared light). These uv pulses are passed through an optical multiplexer 29 which converts each seed pulse into a train of pulses such as sixteen pulses. These trains of pulses are are applied as seed pulses to an excimer amplifier 30 (also triggered with appropriate synchronization, by control unit 12). The output pulses from the excimer amplifier are focused on target tape 16 by lens 19 of target chamber 15.

The Rutherford approach does not use the excimer lasers efficiently as preamplifier and amplifier. In order to efficiently extract energy from an excimer laser amplifier, the energy fluence of the input pulse should be greater than 1 micro Joule per square centimeter and preferably as high as 1 milli Joule per square centimeter. As compared to the present invention, the Rutherford system has four important deficiencies: (1) it uses an argon-ion pump laser which is known to be extremely inefficient; (2) the output of titanium-sapphire seed laser requires third harmonic generation which also adds to the inefficiency of the system; (3) the KrF excimer does not have the power capability of XeCl excimer lasers; and (4) the Rutherford device does not utilize certain known energy enhancement technologies.

Laser pulse enhancement techniques such as q-switching and cavity dumping are well known.

What is needed is an efficient laser system that meets the needs of X-ray lithography to provide 1) high average power and high brightness, 2) low debris levels and 3) low capital and maintenance cost.

SUMMARY OF THE INVENTION

The present invention provides an improved high average power, high brightness laser system. The laser system comprises an XeCl excimer amplifier, an XeCl excimer preamplifier, a means for generating a picosecond seed pulse tailored for the XeCl preamplifier and the XeCl amplifier and a means for focusing the output pulse laser beam onto a spot smaller in area than $100 \times 10^{-6}$ cm$^2$.

We first produce a seed laser beam consisting of a series of bunches of short duration pulses with a bunch frequency in excess of 100 pulses per second. These seed laser pulses are produced by a Nd:YAG pumped dye laser oscillator with a cavity dumper. The pulses in the beam are preamplified in a multipass preamplifier and the pulses are then multiplexed in a pulse train generator into a larger number of lower power pulses. A multi-pass laser amplifier then amplifies each pulse in the bunched pulse laser beam to produce an amplified pulse laser beam which is then tightly focused to so that the individual pulses are at brightness levels in excess of $10^{11}$ Watts/cm$^2$.

A prototype device built and tested by Applicants and their fellow workers has produced a pulsed laser beam with 50 ps, $30 \times 10^{-3}$ Joule pulses at 1,120 pulses per second to provide a beam with average power of 34 Watts. Focusing the beam at a 10 micron diameter spot produces intensity levels of $7\times10^{14}$ per $cm^2$. Using an iron target Applicants have produced X-ray sources of average X-ray power levels in excess of 3.5 Watts. This source is capable of printing integrated circuits with dimensions in the range of 0.1 micron to 0.25 micron at rates of about 10 wafers per hour. The diffraction limit for uv lithographic sources is about 0.25 microns.

Another preferred embodiment of the present invention described herein produces an amplified pulse laser beam having an average power level of up to 1,000 Watts. This embodiment utilizes several multi-pass laser amplifiers in parallel.

Improvements over the Rutherford laser include (1) use of cavity dumpers in the seed laser, (2) two pass operation of the excimer preamplifier and the excimer laser, made possible by the use of spatial filters between the first and the second passes (these filters minimize depletion loss due to spontaneous emission); (3) use of a more powerful excimer laser, (4) use of a Nd:YAG pump laser which is much more efficient than Rutherford's argon-ion laser; (5) use of an excimer preamplifier and (6) use of a simpler, more effective synchronizing circuit.

BRIEF DESCRIPTION OF THE DRAWINGS

FIGS. 1A and 1B are prior art drawings.

FIG. 5 is a drawing showing a multiplexing scheme.

DETAILED DESCRIPTION OF PREFERRED EMBODIMENTS

A preferred embodiment of the present invention, which has been built and tested by Applicants and their fellow workers, can be described by reference to FIGS. 2, 3, 4 and 5.

LASER OSCILLATOR

A mode, locked Nd:YAG laser oscillator 40 which is a commercially available unit, the Antares model provided by Coherent, Inc., produces a pulse laser beam of 150 ps pulses at 80 MHz and an average power of 1.5 Watt at a wavelength of 532 nm to dye laser 42. At 80 MHz, the 150 ps pulses are spaced at 12.5 ns apart and each pulse has an energy level of about $20\times10^{-9}$ Joules and a peak power level of about 130 Watts.

DYE LASER

Figure 1B:
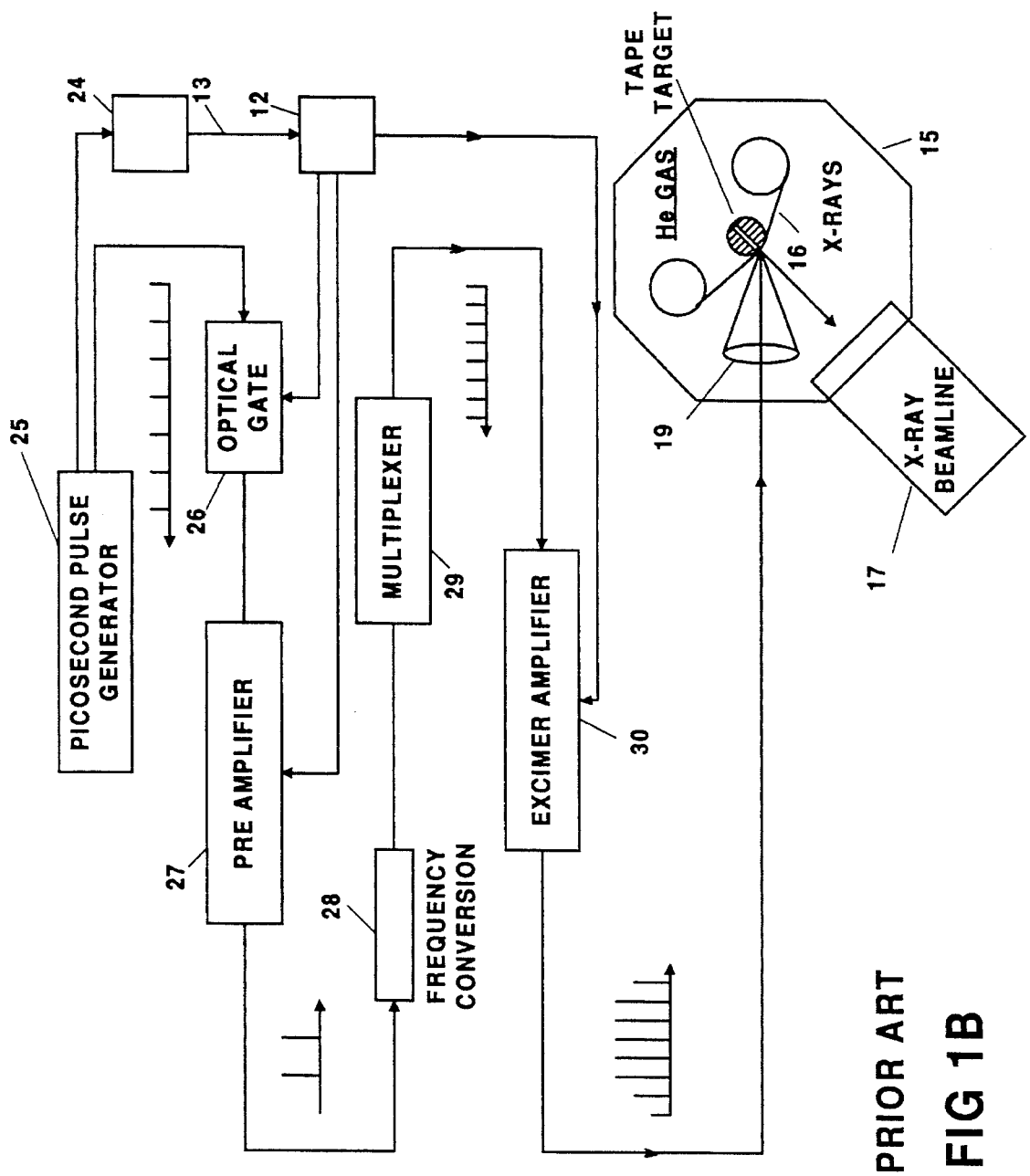
Figure 2:
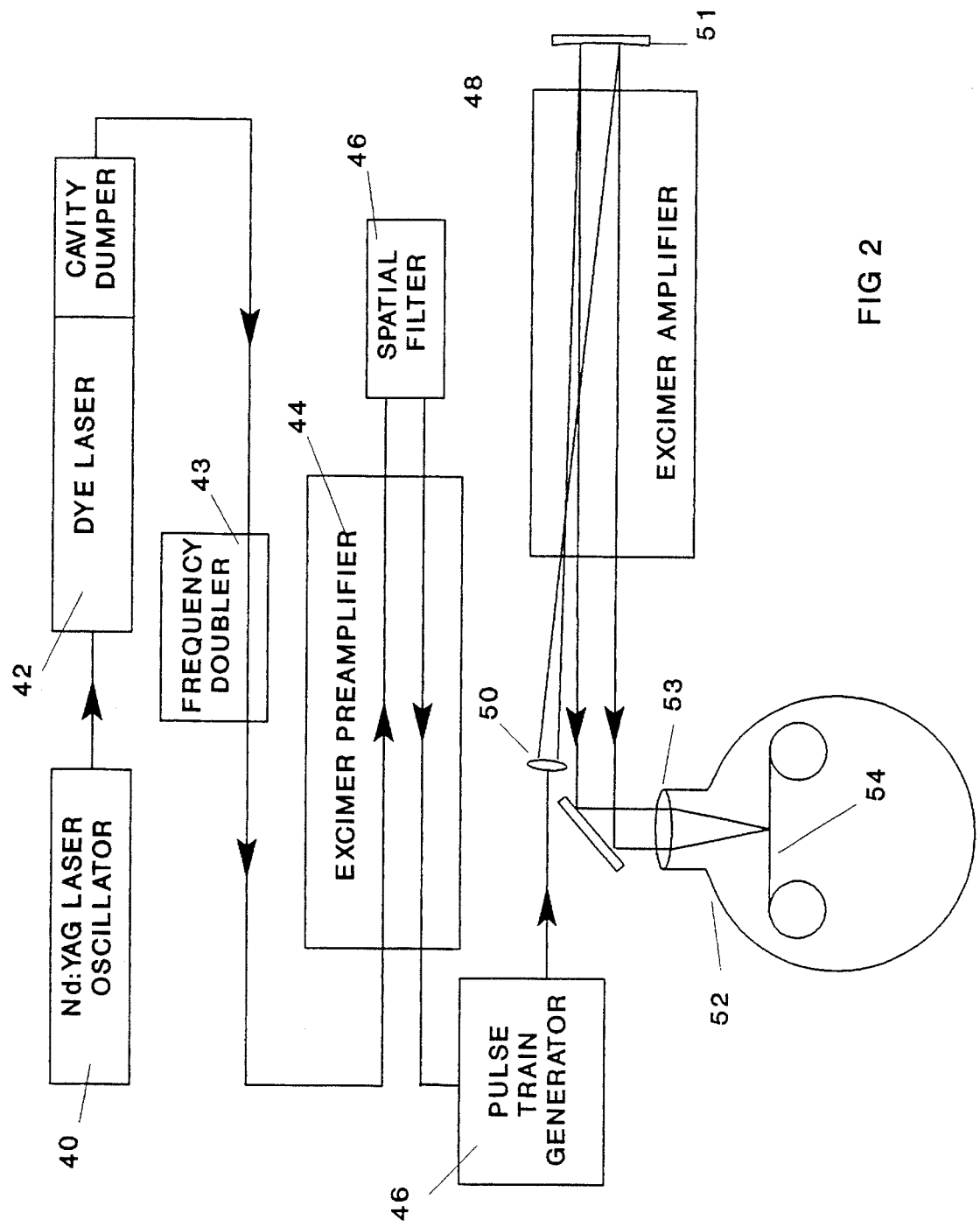
FIG. 2 is a drawing showing a preferred embodiment of the present invention.

The output of laser oscillator 40 is directed to dye laser 42 as shown in FIG. 2. Dye laser 42 is a commercially available dye laser Model 700 supplied by Coherent Inc. This laser operates in a synchronously-pumped mode to generate pulses of about 50 ps pulse duration at a wavelength of 616 nm using Kiton Red laser dye. Dye laser 42 is cavity dumped at a dump rate of 4 MHz, and an average power of about 150 milliwatts. Thus, each dump of the dye laser (spaced at 250 ns intervals) produces a pulse having a duration of about 50 ps and an energy content of about $50\times10^{-9}$ Joules. The dye laser output is then frequency doubled to a wavelength of 308 nm in frequency doubler 43 which is a Beta-Barium Borate non-linear crystal with an efficiency of about ten percent. This reduces the pulse energy to about $5\times10^{-9}$ Joules.

PREAMPLIFIER EXCIMER LASER

Figure 3:
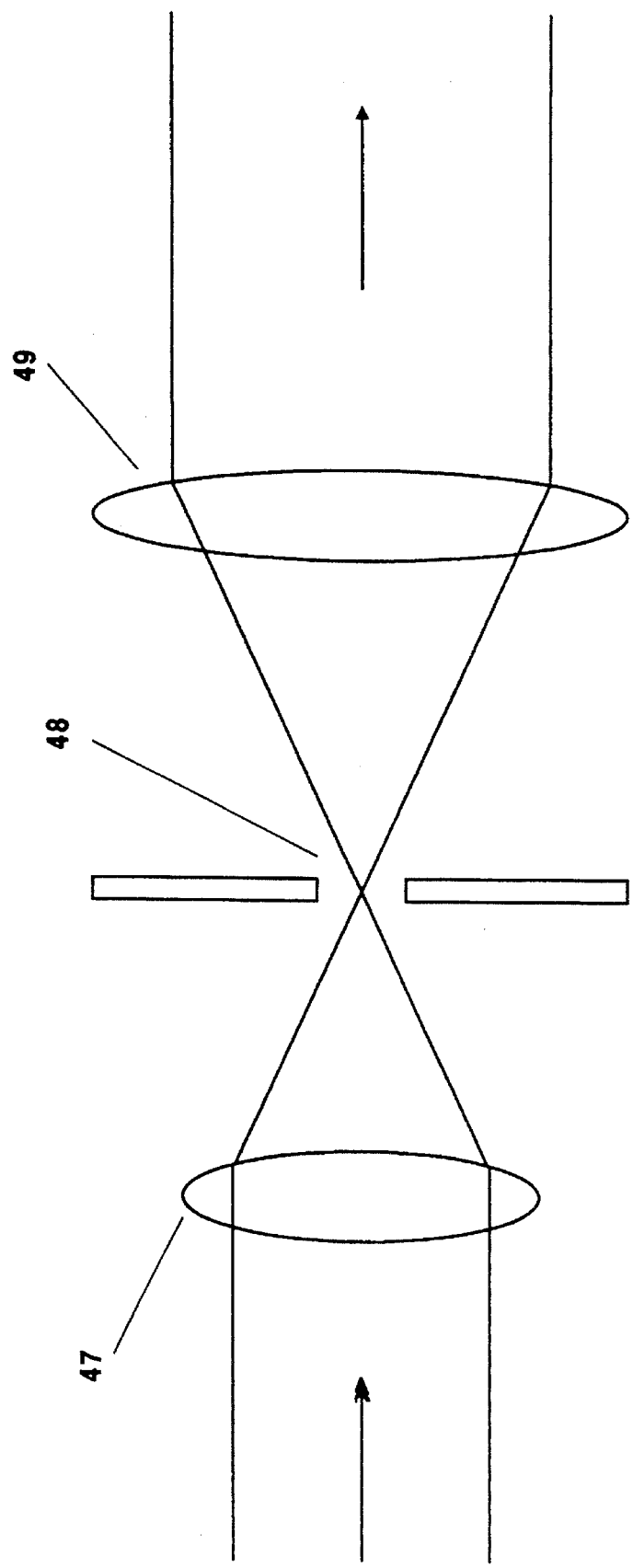
FIG. 3 shows some of the elements of a spatial filter.
Figure 4A:
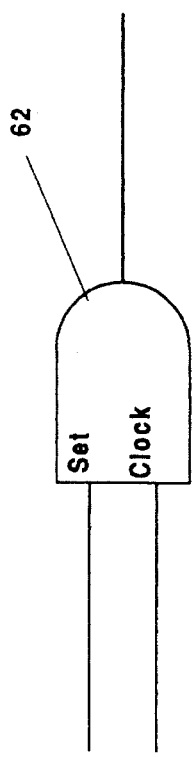
FIG. 4 is a drawing showing a synchronizing system.
Figure 4B:
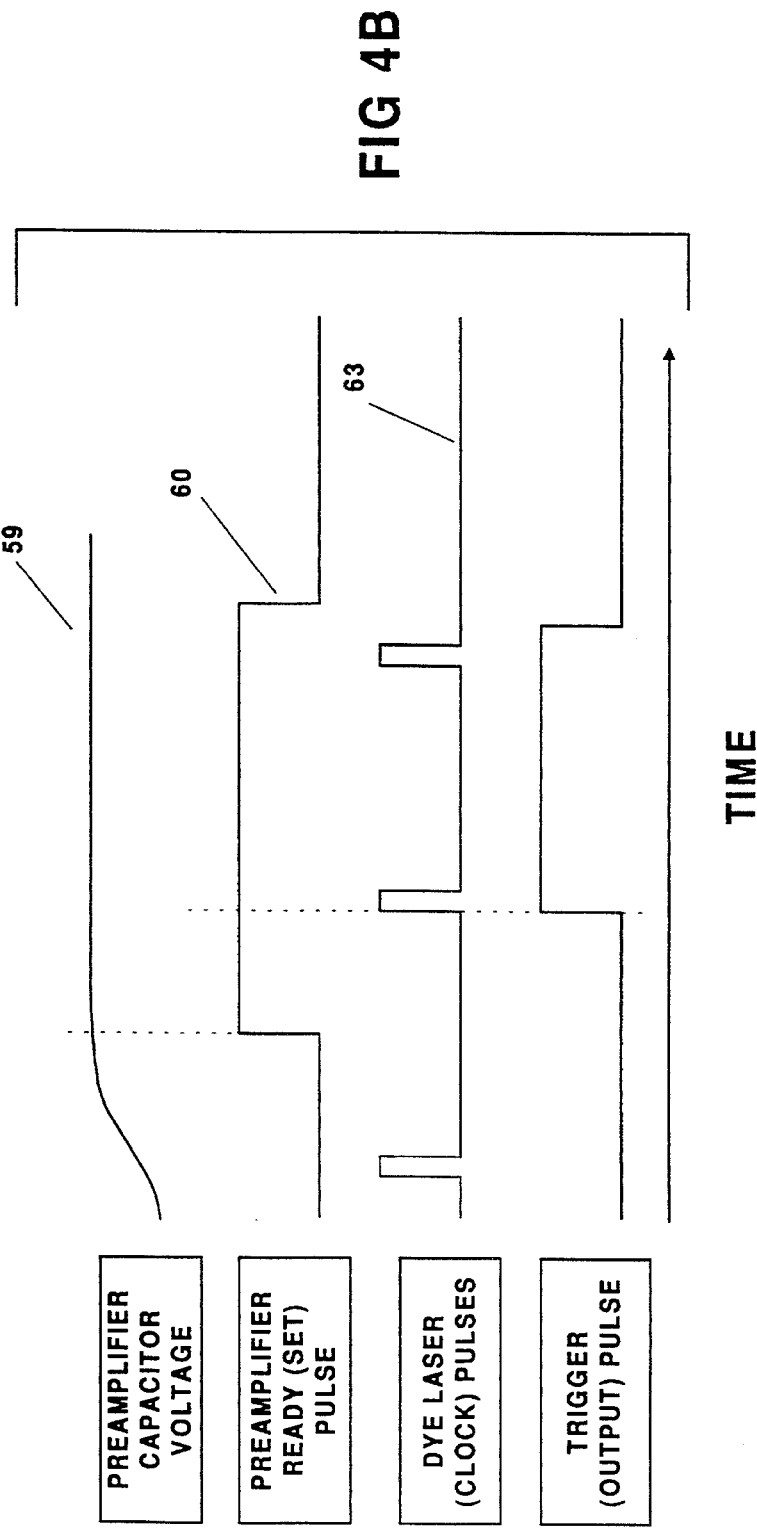

The output of frequency doubler 43 is directed to preamplifier laser 44 which is a XeCl excimer laser amplifier, Model LPX 200 available from Lambda Physik. The laser beam makes two passes through the preamplifier laser. We have modified this laser to include a spatial filter 46 consisting of a 5 cm. focal length lens 47 and a 50 micron aperture 48 and a 15 cm focal length lens 49. Spatial filter 46 spatially filters the beam and expands it to produce a 3 times beam magnification as shown in FIG. 3. As indicated in FIG. 2, spatial filter 46 is positioned between the first and second preamplifier passes. Preamplifier 44 is fired at a frequency of 70 pulses per second. Each firing is synchronized with one of the pulses in the beam from frequency doubler 43. The synchronization is accomplished with the firing circuit as shown in FIGS. 4A and 4B. Signal 60 (from a voltage detector, not shown, indicating approximately full charging the capacitor bank, not shown, of preamplifier 44, the voltage of which is represented by curve 59) sets AND gate 62. Signal 63 which corresponds to pulses from dye laser 42 is used as a clock signal. The next pulse from signal 63 from dye laser 42 following set pulse 60 causes diode 62 to fire in synchronization with the pulse from dye laser 42. Since preamplifier 44 fires at a frequency of 70 Hertz, only one of about 57,000 seed pulses from dye laser 42 is selected and amplified by laser 44. The remainder of the seed beam pulses are rejected. (Since the energy of the seed pulses is so small, wasting of nearly all of the seed pulses has very little effect on the efficiency of the total system.) The preamplified pulses are amplified from an energy per pulse of about $5\times10^{-9}$ Joule to an intermediate energy of $0.5\times10^{-3}$ Joule, while retaining the pulse duration of about 50 ps and the good beam quality of the seed pulse. It is important to maintain beam quality and minimize amplified spontaneous emission on the second preamplifier pass. Thus, the output of preamplifier laser 44 is a beam of short pulses each pulse having an energy of about $0.5\times10^{-3}$ Joule and a duration of about 50 ps. The pulses are spaced at 15 millisecond intervals. This results in an average pulse rate of about 70 pulses per second with a beam quality of about 2 times the diffraction limit.

PULSE TRAIN GENERATOR

The output of laser preamplifier 44 is directed to pulse train generator 46 which splits the each pulse in the pulsed laser beam from preamplifier 44 into a train of pulses. A schematic diagram of pulse generator 46 in shown in FIG. 5. This pulse train generator is a series of beam splitters and mirrors arranged in four loops, with each loop having an optical propagation time of 2 ns, 4 ns, 8 ns and 16 ns, respectively. The resulting output pulse train is 16 pulses, each spaced by 2 ns. The first eight pulses are plane-polarized along a specified axis. The second eight pulses pass through a half-wave plate to result in plane-polarized along the orthogonal axis. The two orthogonally-polarized pulse trains are combined at a thin-film polarizer to generate a single train of 16 pulses. The output of the pulse train generator thus is a beam of bunches of pulses, each bunch comprising 16 pulses at 2 ns intervals, the bunches being spaces at 14 millisecond intervals. The energy of each individual pulse is reduced by a factor of a little more than 16 to about $0.03\times10^{-3}$ Joules, but the total average power of the beam is still about 35 milliwatts. The mirrors in pulse train generator 46 are preferably adjusted to co-allign the 16 pulses in approximately in single direction but not exactly. We prefer that the mirrors be slightly misaligned so that the, pulses are spread over an angle of about 1 milliradian. We discuss the reason for this below.

HIGH POWER AMPLIFIER

The output of the pulse train generator 46 is directed to high power amplifier 48. Amplifier 48 is a XeCl excimer laser used in a double pass configuration. In our prototype device we use a high power XeCl excimer laser (similar to Model 4000 available from Lambda Physik and several other commercially available high power XeCl lasers) modified to operate as an amplifier. The pulse train is injected into the amplifier through a positive lens 50 such that the beam has a small diameter at an edge of the amplifier input aperture. Lens 50 focal length (about 50 cm) is chosen such that the beam expands as it propagates along the first pass, to fully fill the aperture of amplifier 48 at the end of the first pass. The beam is then reflected for a second pass by a concave mirror 51 having a radius of curvature of about 3 meters chosen to result in a collimated beam for the second pass. The resulting output is a pulse laser beam consisting of bunches of pulses, the bunches spaced at 14 millisecond intervals with 16 pulses (spaced at 2 ns intervals) in each bunch. This is an average of 70 pulse bunches per second and 1120 pulses per second with an energy per pulse of $30 \times 10^{-3}$ Joules and a pulse duration of about 50 ps for a peak power per pulse of about $0.6 \times 10^9$ Watts and an average power of the beam of 34 Watts.

TARGET CHAMBER

The beam from high power amplifier 50 is directed to target chamber 52 where the high power pulses are focused by a high quality, aberation-corrected lens 53 such as a 10 cm focal length aspheric lens or a triplet lens system to produce a high intensity beam on metal tape target 54 which preferably is a soft copper tape. (Nickel or iron alloy tape could also be used). The thickness of the tape is preferably chosen to be no greater than 25 microns, so that each pulse blows a hole in the tape so that most of the debris is blown through to the back of the tape. The beam is focused to a 10 micron diameter spot size, but because the mirrors of the pulse train generator are slightly out of alignment, the spots are spread over a 200 micron diameter area. At the cross sectional area of $8 \times 10^{-7}$ cm$^2$, corresponding to the 10 micron spot, each $0.6 \times 10^9$ Watt pulse will provide an intensity of $7 \times 10^{14}$ Watts/cm$^2$. At these intensity levels each pulse in the train generates a plasma at the target consisting of highly ionized atoms of copper from the copper tape target. The plasma temperature and density are sufficiently high that significant quantities of x-rays characteristic of copper plasma are generated in a wavelength range from 8 to 16 A. Typically 5 to 10 percent of the laser pulse energy is converted to X-ray emission in this range. In our prototype device we achieve a conversion efficiency of about 5 percent using copper and an 11 percent efficiency using iron targets. This gives us an average X-ray power of about 3.5 Watts for iron and about 1.8 Watts for copper.

LITHOGRAPHY

With 8–16 A wavelength X-rays we can print very small circuits in the range of 0.1 microns to 0.25 microns. The 3.5 Watt power output would allow a production rate of about 10 wafers per hour. By increasing the pulse rates of the two excimer lasers to 300 Hertz by using a commercially available 300 Hertz lasers, we could increase the average X-ray power to 15 watts and increase our production rate to about 40 wafers per hour. While the above description contains many specificities, the reader should not construe these as limitations on the scope of the invention, but merely as exemplifications of preferred embodiments thereof. Those skilled in the art will envision many other possible variations that are within its scope. For example, the there are many other sources for the commercially available lasers which have been listed. Alternatively, standard laser text books contain instructions for fabrication of these lasers. This invention combines an XeCl excimer amplifier and an XeCl excimer preamplifier and a picosecond seed pulse tailored for a XeCl excimer device. The seed laser could be supplied by a small excimer laser with a Pockels cell configured to slice a pulse of less than 100 picoseconds (preferably about 50 ps) from the excimer laser output. This pulse would be directed to the preamplifier. In this case the amplifier fire signal pulse would be generated from the electrical pulse used to switch the Pockel cell. The small excimer laser could be created within a portion of the preamplifier cavity. The seed laser could also be generated with a mode-locked, q-switched Cr:LISAF laser. This is a tunable laser that can be tuned to the wavelength of the XeCl excimer laser by third harmonic generation. The mode-locking technique generates the pulses of 50 ps duration, while q-switching provides energy enhancement. It should be noted that if background amplified spontaneous emission from the preamplifier interferes with the operation of the amplifier in generating clean, well modulated trains of pico second pulses, a saturable absorber dye may be inserted at the focus of lens 50, as shown in FIG. 2. A suitable dye for the XeCl excimer laser wavelength would be BBQ (4,4 dl(2-butyloctoxy)-p-quater-phenyl), dissolved in cyclohexane (as discussed in Journal of Applied Physics, vol 65, page 428) at a concentration such that the intensity of the picosecond pulse bleaches the dye while the intensity of the background does not. Persons skilled in the art will recognize that two or more of amplifier laser 48 shown in FIG.2 could be used in parallel to provide a higher power configuration. Thus, average laser power outputs in the range of 500 Watts to 1,000 Watts can be provided with currently available laser equipment.

Another embodiment assembled and tested by Applicants places the multiplexer 46 shown in FIG. 2 between the first and second passes through the preamplifier 44 following spatial filter 46. This works best for preamplifiers having relatively long gain pulses (greater than 30 ns). The system shown in FIG. 2 works better for preamplifiers with short gain pulses (shorter than 10 ns).

Accordingly, the reader is requested to determine the scope of the invention by the appended claims and their legal equivalents, and not by the examples which have been given.

We claim:

1. An improved high average power, high brightness laser system comprising:
    A) a seed laser means for producing a seed laser beam consisting of a series of pulses each pulse having a duration of less than 1 ns with a pulse rate in excess of 100 pulses per second,
    B) an XeCl excimer preamplifier arranged to amplify said seed laser beam to produce a preamplified pulse laser beam defining preamplified pulse rate,
    C) an XeCl excimer laser amplifier arranged to amplify said preamplified pulse laser beam to produce an amplified pulse laser beam comprised of laser pulses having durations of less than 1 ns and power levels of more than $100 \times 10^6$ Watts with and average beam power in excess of 3 Watts and defining an amplified beam path, E) a focusing means for focusing on a target said amplified pulse laser beam to a spots smaller in cross section than $100 \times 10^{-6}$ cm$^2$ to produce pulse intensity levels in excess of $10^{12}$ Watts/cm$^2$.

2. A laser system as in claim 1 and further comprising a multiplexing means for increasing the preamplified pulse rate in said preamplified pulse laser beam.

3. A laser system as in claim 1 wherein said preamplifier is a multi-pass laser amplifier said system further comprising a spatial filter means for spatially filtering said seed beam after its first pass through said first pass through said preamplifier.

4. A laser system as in claim 1 wherein said laser amplifier is a multi-pass laser amplifier.

5. A laser system as in claim 1 wherein said seed laser means comprises a Nd:YAG laser oscillator, a dye laser with a cavity dumper and a frequency doubler.

6. A laser system as in claim 5 wherein said small excimer laser is created within said first laser amplifier.

7. A laser system as in claim 1 wherein said seed laser means comprises a small excimer laser defining a small laser output and a Pockels cell configured to slice a pulse of less than 100 picoseconds from said small laser output.

8. A laser system as in claim 1 wherein said seed laser means comprises a mode-locked, q-switched Cr:LISAF laser.

9. A laser system as in claim 1 wherein said laser system further comprises a saturable absorber dye positioned in said amplifier beam path.

10. An improved high average power, high brightness laser system comprising:

A) at least one seed laser means for producing a seed laser beam consisting of a series of pulses each pulse having a duration of less than 1 ns with a pulse rate in excess of 100 pulses per second, B) at least one XeCI excimer preamplifier arranged to amplify said seed laser beam to produce a preamplified pulse laser beam defining a preamplified pulse rate, C) at least one multiplex means for increasing the preamplified pulse rate in said preamplified pulse laser beam, D) at least one XeCI excimer laser amplifier arranged to amplify said preamplified laser beam to produce an amplified pulse laser beam comprised of laser pulses having durations of less than 1 ns and power levels of more than $100 \times 10^6$ Watts with and average beam power in excess of 3 Watts and defining an amplified beam path, E) at least one focusing means for focusing on a target said at least one amplified pulse laser beam to spots smaller in cross section than $100 \times 10^{-6}$ cm$^2$ to produce pulse intensity levels in excess of $10^{12}$ Watts/cm.

11. A laser system as in claim 10 wherein said at least one XeCI excimer laser amplifier is a plurality of XeCI laser amplifiers being arranged to operate in a parallel configuration.

* * * * *